United States Patent
Murphy

(10) Patent No.: US 8,761,989 B1
(45) Date of Patent: Jun. 24, 2014

(54) METHOD OF MATERIAL HANDLING WITH AUTOMATIC GUIDED VEHICLES

(71) Applicant: Christopher John Murphy, Ann Arbor, MI (US)

(72) Inventor: Christopher John Murphy, Ann Arbor, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 1 day.

(21) Appl. No.: 13/718,277

(22) Filed: Dec. 18, 2012

(51) Int. Cl.
*G06F 15/78* (2006.01)

(52) U.S. Cl.
USPC ............................. 701/25; 701/23

(58) Field of Classification Search
USPC .................................. 701/23, 25
See application file for complete search history.

(56) References Cited

U.S. PATENT DOCUMENTS

| | | | |
|---|---|---|---|
| 3,968,559 A | 7/1976 | Karlsson | |
| 5,091,855 A * | 2/1992 | Umehara et al. | 701/23 |
| 6,092,010 A | 7/2000 | Alofs et al. | |
| 6,285,929 B1 | 9/2001 | Hashimoto | |
| 6,654,647 B1 | 11/2003 | Kal | |
| 7,178,660 B2 | 2/2007 | Dehne et al. | |
| 2006/0229804 A1 | 10/2006 | Schmidt et al. | |
| 2007/0233337 A1 | 10/2007 | Plishner | |

FOREIGN PATENT DOCUMENTS

| | | |
|---|---|---|
| EP | 0304942 A2 | 3/1989 |
| GB | 2129161 A | 5/1984 |
| JP | 11194823 A | 7/1999 |
| JP | 2000259248 A | 9/2000 |
| JP | 2001125639 A | 5/2001 |
| JP | 2005352855 A | 12/2005 |
| JP | 2009107753 A | 5/2009 |

OTHER PUBLICATIONS

Automated guided vehicle; Wikipedia; http://en.wikipedia.org/wiki/Automated_guided_vehicle; Nov. 10, 2011; 12 pages.

* cited by examiner

*Primary Examiner* — Mary Cheung
*Assistant Examiner* — Yuen Wong
(74) *Attorney, Agent, or Firm* — Dickinson Wright PLLC

(57) ABSTRACT

A system and method of automatic guided vehicles that are capable of providing synchronized travel along a line or path such that regular manufacturing operations may be performed to material or workpieces on the vehicle without the need for a traditional conveyor systems.

30 Claims, 3 Drawing Sheets

METHOD OF MATERIAL HANDLING WITH AUTOMATIC GUIDED VEHICLES

TECHNICAL FIELD

The present invention is generally directed to material handling vehicles and more particularly to a system and method of automatic guided vehicles that are capable of providing synchronized travel along a line or path such that regular manufacturing operations may be performed to material or workpieces on the vehicle without the need for a traditional conveyor systems.

BACKGROUND OF THE INVENTION

For over a century now, manufacturers have used assembly lines to provide reliable and consistent work flow of workpieces and material through various manufacturing operations to create an end product. These assembly lines widely vary depending on the desired end product as well as the type of manufacturing process; however, almost all have some common features. Most assembly lines include a conveyor system such as a chain conveyor system, power and free conveyor system or any other type of material conveyor system that is designed and installed permanently into the facility. To provide consistent work flow, most conveyor systems are configured to couple to or support a workpiece at a substantially uniform predetermined distance and configured to move along a path at a set speed. Each conveyor system is configured to keep the workpiece consistently spaced no matter the speed, acceleration, deceleration, stop, or start conditions. As all workpieces are securely coupled in some form together, consistent travel of all workpieces automatically occurs. Most conveyor systems also require a chain, belt, or track that forms the path, couples all objects together and is installed permanently into the manufacturing facility. As such, traditional assembly lines and conveyor systems work extremely well at providing consistent through put of work in manufacturing operations, especially where the timing of workpieces entering and exiting a particular work station is important, but they have been generally expensive to initially install and also lack flexibility for easy reconfiguration. The presence of the conveyor equipment often prevents access to the part or workpiece from all sides and prevents workers from easily and safely crossing the conveyor path.

Automatic guided vehicles or AGVs are commonly used in many industries to provide material handling and transport various loads without a human operator. The term "AGV" is commonly used to refer to robust vehicle designs having any number of available automated guidance systems. The term "AGC" is also commonly used to refer to less robust vehicles such as automatic guided carts which are similar in nature to AGVs, however, are typically designed to carry smaller loads. Throughout this application, including the claims, the term "AGV" or automatic guided vehicle shall mean and include both AGVs and AGCs as well as any other vehicle that is capable of being autonomously guided. Autonomous guidance and AGVs do not include vehicles being remotely controlled by human operators, but instead must be capable of following a path or route without human intervention.

Current AGV designs generally include a frame with at least two wheels, one of which may be a drive wheel. The drive wheel provides motion to the cart and may also be a steerable drive wheel but in some instances, the non-driven wheels may instead or in combination, act as the steerable wheel. An AGV requires a guidance system to control its movement. A variety of guidance systems are available for use in AGVs including wire guidance, laser guidance, magnetic tape guidance, odometer guidance, inertial guidance, dead-reckoning, optical guidance and a variety of other less used guidance systems. Each type of guidance system generally has associated positives and negatives. For example, an inertial guidance system may be susceptible to tracking errors where the travel distance and direction measured by the AGV differs from the actual distance and direction of travel due to wheel slip on the supporting surface. A variety of methods have been proposed to minimize such tracking errors but the tracking errors may compound over long travel distances. As such, many AGVs include backup or secondary guidance systems which may provide a position or status check, and as such be used to correct for any errors. For example, way point reference markers may be added to the system such as magnetic paint, radio frequency identifier tabs and optical tags to allow an AGV to update its position to a correct position and thereby minimize any guidance errors. Some AGV systems today that use sensors that detect existing environmental features and do not require the addition of reference markers.

Due to the variety of potential errors introduced by at least one of the guidance and drive systems, AGVs have primarily been used in facilities only for the moving of materials such as delivery of raw materials to an assembly line, the removal of finished materials to storage, and from storage to distribution and shipping. In these instances, the AGV may be programmed with a specific path that an individual AGV travels along, but none of the issues associated with a conveyor system in a manufacturing operation are of concern. In addition, while AGVs may be part of material handling system and work in cooperation with the overall system, they do not individually coordinate movement in the facilities other than avoiding potential collisions between AGVs. As such, AGVs have generally not worked in coordination but instead each perform their own unique task and only coordinate to prevent collisions, or move material along desired paths such that parts A are coordinated to arrive with a parts B at a particular work station.

Some manufacturers have tried to use automatic guided vehicles in manufacturing operations or in various facilities as a replacement for typical conveyor systems although until the present invention, no manufacturer has successfully implemented such a system. Coordinated movement of AGVs in a cost-effective and reliable manner, similar to conveyor systems was not yet possible. For example, if an AGV system was to coordinate all AGVs using a central broadcast time signal, the time signal to each AGV has complications with respect to starting and stopping, which is frequently required in a manufacturing facility. More specifically, there are many timing problems associated with identifying the exact time a vehicle stops or starts due to inherent latencies in communication systems. Without an exact time the vehicle stops or starts, it is unknown where a particular vehicle is in relation to other vehicles and in relation to the external manufacturing operation. As such, problems may occur in restarting the system, such with spacing between the AGVs.

SUMMARY OF THE INVENTION

The present invention is directed to a system and method of automatic guided vehicles that are capable of providing synchronized travel along a line or path such that regular manufacturing operations may be performed to material or workpieces on the vehicle without the need for a traditional conveyor systems.

The method of operating a conveyor system for material handling in a facility generally uses a plurality of AGVs, each having a controller. The controller includes a communication system and a guidance system. The AGVs may be in communication with a central controller, at least one AGV, such as the lead AGV may be in communication with the central controller, or the system may use a distributed control system without the central controller, with the control residing collectively in the AGV controllers.

The method generally includes the steps of determining a travel path having at least one line portion defined by an initial line and an end line; inputting a guided route for the AGV to follow, wherein the guided route includes instructions regarding the AGVs travel along the at least one line portion; assigning a unique ID to each AGV; guiding the plurality of AGVs along the travel path; automatically determining a lead AGV in the line portion; automatically determining a last AGV in the line portion; automatically updating the last AGV in the line portion each time an AGV from the plurality of AGVs crosses the initial line of the line portion; automatically updating the lead AGV to the immediate trailing AGV in the line portion each time the lead AGV from the plurality of AGVs crosses the end line; and maintaining a designated spacing between each AGV from the plurality of AGVs within the line portion.

The method may further include a step of inputting the travel path, including the line portion, into each guidance system of the plurality of AGVs. Of course, the input travel path may be only input in the lead AGV and then distributed as needed to the other AGVs. The method may also include inputting a desired line speed for the AGV to travel along the line portion. The method may also include a step of inputting a desired travel speed for the AGV when the AGV is not in the line portion. The desired line speed and the desired travel speed may be different, such that an AGV may progress through a certain line segment at a reduced pace while manufacturing operations are being performed and then travel between line segments, or back to the entrance of the same line segment as quickly as possible to reduce the number of AGVs used in a particular facility or manufacturing operation.

The method may use a lead AGV and be configured such that each of the following plurality of AGVs in the line portion match the lead AGV speed. The method may automatically determine the lead AGV and assign a lead token to the lead AGV. Of course, the method may automatically update the lead AGV by passing a lead token from the lead AGV as it crosses the end line to the next trailing AGV. Similar to the lead token described above, the method may automatically determine a last AGV and assign an end token to the last AGV. Of course, the method may automatically update the last AGV in the line portion each time an AGV from the plurality of AGVs crosses the initial line of the line portion further includes the step of passing the end token from the preceding last AGV to the updated last AGV. The method may include automatically updating the last AGV in the line portion by providing the unique ID of the AGV updated as the new last AGV to at least one of another AGV and a central controller.

The method step of guiding the plurality of AGVs along the continuous travel path may include the step of guiding the AGVs through the line portion, and further the step of guiding the plurality of AGVs with consistent spacing and speed in the line portion. More specifically, the step of guiding the AGVs through the line portion may include the step of tracking the distance traveled by the AGV since crossing the initial line to enter the line portion. The AGV when it crosses the end line of the line portion may clear the distance traveled from memory.

The method maintains a designated spacing between each AGV and may further include the step of determining the distance traveled from the initial line on the line portion for each AGV. As such, the system may ensure that the distance between each AGV is determined by subtracting the distance traveled of a trailing AGV from a prior AGV and comparing the determined distance between matches the designated spacing. More specifically, the step of ensuring that the distance between matches the designated spacing may further include the step of adjusting the speed of the trailing AGV to approach the designated spacing and repeating the step of subtracting the distance traveled of the trailing AGV on which speed was adjusted from the prior AGV and adjusting the speed, and repeating the steps of subtracting and adjusting until the trailing AGV and prior AGV are spaced apart with the designated spacing. The step of adjusting the speed may further include the step of limiting any speed adjustment within a specified range. As the step of adjusting the speed for AGV is performed, each subsequent AGV may automatically, in response to a speed adjustment by a prior AGV or any AGV in a line segment performs the steps of ensuring that the distance between each AGV is the designated spacing and adjusting speed as needed to maintain the designated spacing with the prior AGV.

The step of maintaining the designated spacing may further include the step of continuously calculating the distance traveled by each AGV from the initial line along the line portion and communicating the distance traveled to one of a prior and a trailing AGV. The step of maintaining may further include the step of at least one of the prior and the trailing AGV calculating the spacing between the two AGVs and wherein the trailing AGV uses the calculated spacing to adjust the speed of the trailing AGV to approach the desired designated spacing.

The method may include a step of stopping at least one AGV in the line portion in response to a stop condition and wherein the stopped AGV communicates a stop status to each subsequent AGV within the line portion and wherein each subsequent AGV stops upon receiving said stop status from any prior AGV. Upon stopping, each stopped AGV determines the distance to at least the immediate prior AGV. The leading AGV of the stopped AGV may automatically restart upon removal of the stop condition and communicate a restart signal to other stopped AGVs, including at least the trailing AGV upon starting. Upon receiving a restart signal, the trailing AGV would determine a start delay. The step of determining a start delay may include the step of determining a distance between the prior AGV and the subject AGV and if the distance is greater than the designated spacing a start delay of zero is determined and if the determined distance is less than the designated distance a start delay of sufficient time to ensure at least the designated spacing is maintained to the prior AGV is determined. At least each subsequent AGV would perform the steps of determining a start delay upon receiving a restart signal from the prior AGV.

In the method, the step of maintaining a designated distance may further include the step of automatically determining the length of at least one of a carrier and a load on the AGV and adjusting the spacing between the AGVs to match the designated distance while accounting for variations in length of the load and carrier.

The method may include the step of maintaining a communication link between each prior and each trailing AGV and stopping a trailing AGV upon failure of the communication link.

The travel path may be a continuous loop and the method may include a step of directing the AGV along the travel path to the next initial line after the AGV crosses the end line of the current line portion.

Further scope and applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The present invention is generally directed to material handling vehicles and more particularly to a system and method of automatic guided vehicles that are capable of providing synchronized travel along a path such that regular manufacturing operations may be performed to material or workpieces on such automatic guided vehicles without the need for traditional conveyor systems.

Figure 1:
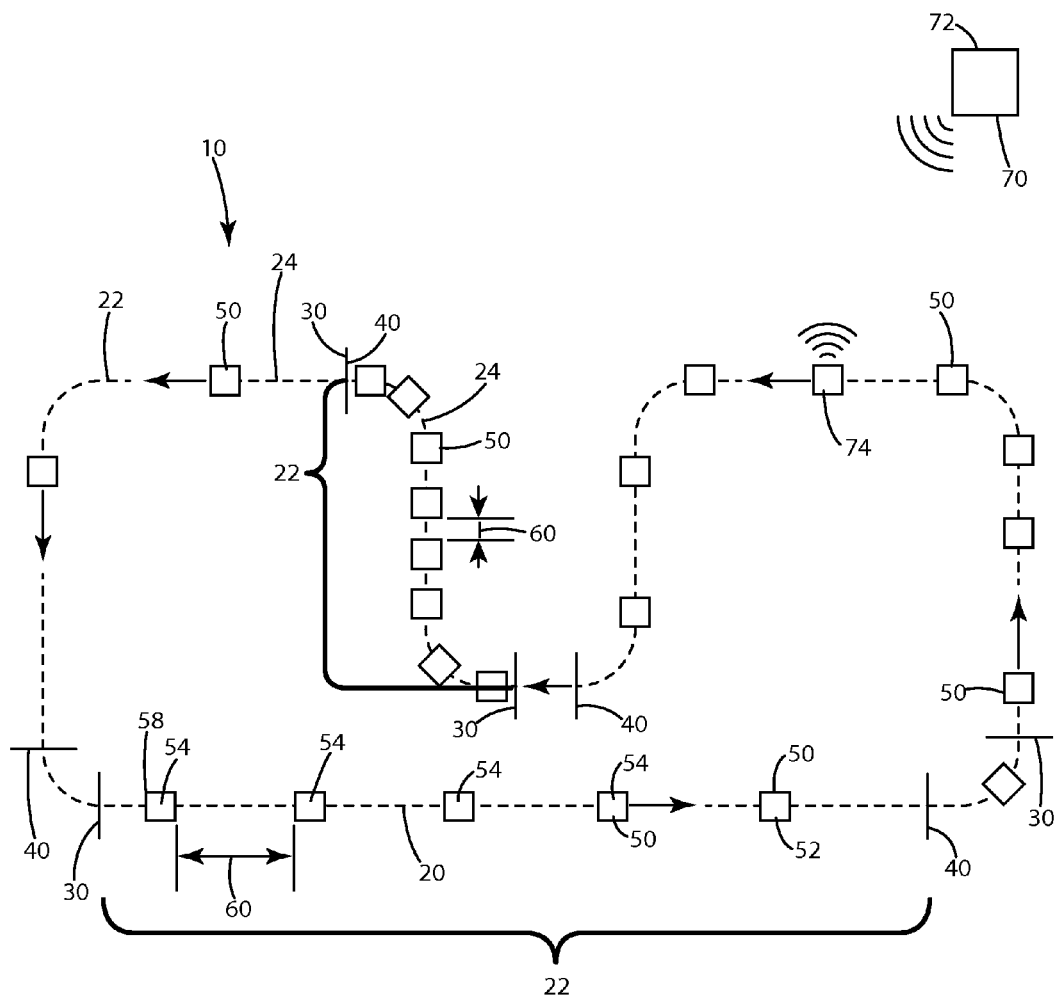
FIG. 1 is a schematic view of an exemplary conveyor system using automatic guided vehicles.
Figure 2:
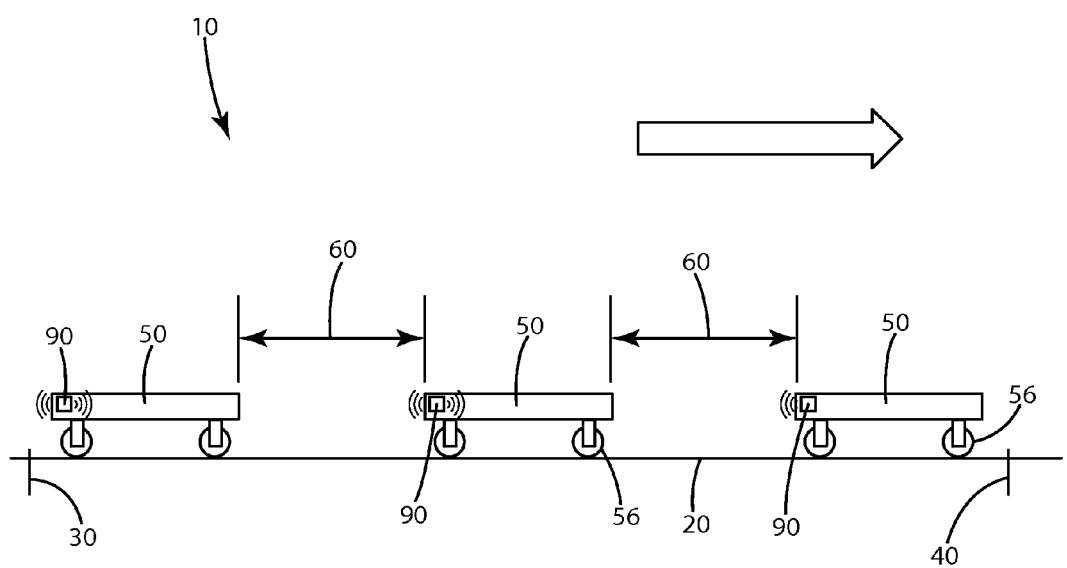
FIG. 2 is a side view of automatic guided vehicles within a portion of an exemplary conveyor system.
Figure 3:
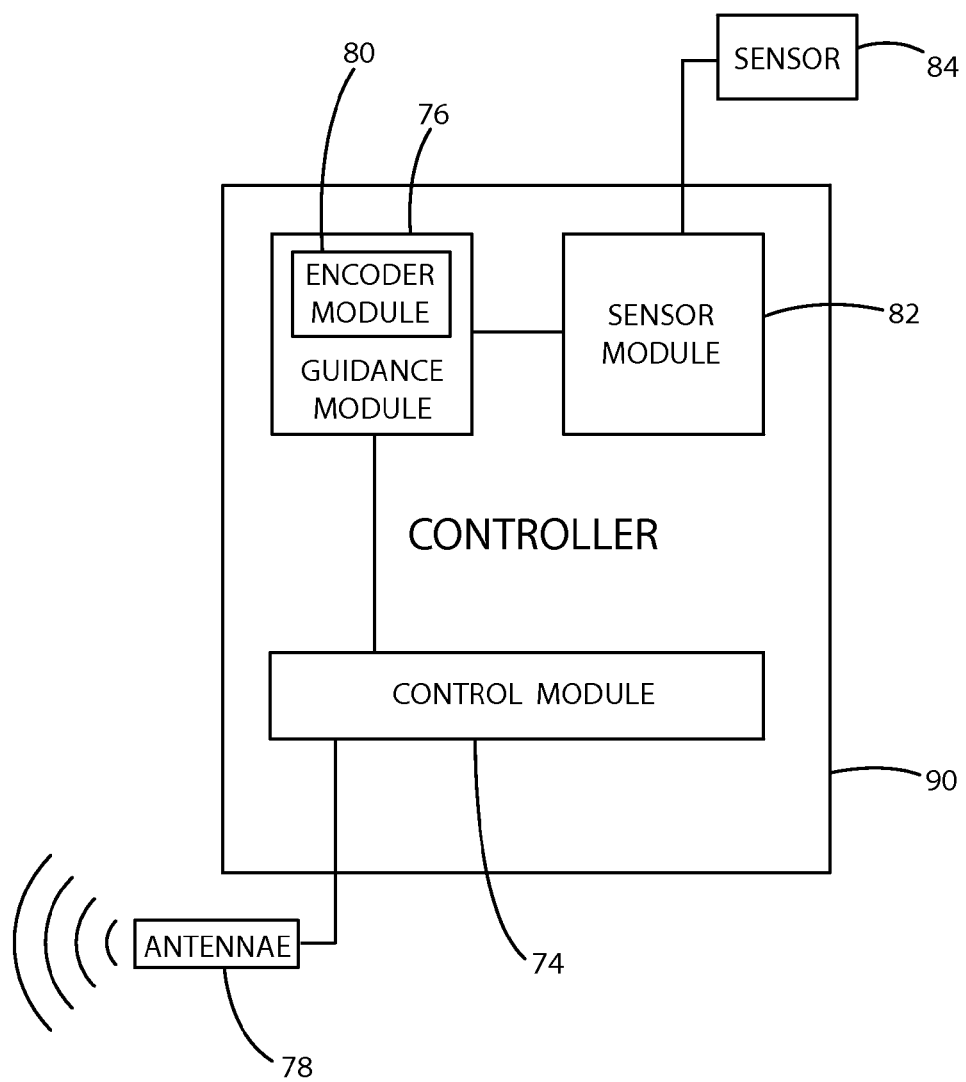
FIG. 3 is a schematic drawing of an exemplary AGV controller.

The system 10, as illustrated in FIGS. 1 and 2, generally includes a travel path 20 having individual line segments or portions 22 bound by an initial line 30 and an end line 40. As an automatic guided vehicle (AGV) 50 travels along the path 20 within the line segment 22, each AGV 50 maintains a separation distance 60 from adjacent AGVs. With any given line segment 22 with at least two AGVs, there is a lead AGV 52, a subsequent AGV 54 and a last AGV 58. Of course, in some instances the subsequent AGV 54 and last AGV 58 may be the same. The system 10 may include a central controller 70 having a communication system 72 communicating with each AGV 50. However, in some systems 10, no central controller 70 or communication system 72 is used and instead each AGV 50 may communicate with each other independently in a distributed communication system or in addition to the central controller 70. Each AGV 50 may include an AGV controller 90 generally having a control module 74, a guidance module 76, and a sensor module 82 coupled to at least one sensor 84. The guidance module 76 may include a travel distance encoder module 80. The controller 90 may be in communication with an antennae 78 communicating with at least one of the central controllers 70 and an adjacent AGV 50, or any other AGV 50 in the travel path 20. It is expected that each AGV have wheels 56 of which one may be a drive wheel and one a steerable wheel.

The method generally includes providing a system 10 having AGVs 50 configured to travel along a determined travel path 20. The system 10 is generally configured to work in and around the facility such as a manufacturing, distribution, or warehouse facility. It is particularly suited to a manufacturing facility in that the system is configured to allow for consistent spacing and speed as it moves along the line portion 22 or in some instances between individual work stations at which manufacturing operations may be performed.

The travel path 20 and included line segments 22, as well as the initial line 30 and end line 40 of such line segments 22, are provided and input into the AGV controller, specifically the guidance controller 76. Once each AGV 50 has learned the desired travel path 20 including line segments 22, a unique ID is assigned. During operation, a central controller or a distributed control between the AGVs 50 may guide the plurality of AGVs 50 along the travel path 20. The system 10 automatically determines a lead AGV 52 in the line portion 22 as well as a last AGV 58 in the line portion 22. As each AGV 50 continues to move along the line segment 22, at some time the lead AGV 52 will cross the end line 40 of the line segment 22 and the system 10 will automatically update which AGV 50 is the lead AGV 52 in the line segment 22. In addition, as AGVs continuously enter the line segment 22, the system automatically updates which is the last AGV 58 in a particular line segment 22. As the AGVs 50 progress along the line segment 22, each AGV 50 maintains a designated spacing between each AGV 50 forming the plurality of AGVs 50 in the line segment 22. Of course, the line segment 22 may be broken into multiple sub-segments in 24 which the spacing may vary between manufacturing operations. However, in each instance within a particular line segment 22 or sub-segment 24, which could be considered just smaller line segments 22, the spacing is maintained as a designated spacing 60 between each AGV 50.

The step of determining a travel path 20 having at least one line portion 22 defined by initial line and an end line is generally performed in the manufacturing facility, warehouse or distribution center. The terms manufacturing facility, warehouse, distribution center or other building in which the AGV operates in the present invention hereinafter shall be generally referred to as a facility. It is expected that an AGV will operate in and about a particular facility. As such, the operator of a system 10 will generally set up the facility similar to when a conveyor system is used between individual work stations. However, instead of installing a traditional conveyor system, the operator of the facility determines a travel path 20 for AGVs 50 to travel between particular work stations or destinations. It is expected that the travel path 20 determined is a substantially continuous travel path such that each AGV 50 after exiting a particular line portion 22 within the travel path 20 eventually circles back to enter the initial line portion 30 within particular line segment 22. As the travel path 20 is virtually determined in many instances, the only changes to a facility needed in moving a travel path may be as simple as providing new initial or end lines 30, 40 by painting on the floor of the facility. As such, the present invention provides all the positives of a traditional conveyor system, but is much more flexible and has very low cost in making any changes in the travel paths 20.

Although not illustrated in the Figures, each travel path 20 may have a variety of different segments 22, 24 and be much more complex than the simple loop route illustrated in FIG. 1. Once the travel path 20 is determined, each line portion 22 is defined by an initial line 30 and an end line 40. As illustrated in FIG. 1, the travel path 20 includes multiple line portions 22 and in some instances, the initial line 30 and end line 40 are the same line such that an AGV 50 crossing the end line 40 of one line segment 22 is also crossing the initial line 30 of a subsequent line segment 22. In such instances, the adjacent line portions or segments 22 may be considered all one large line segment or portion 22 with sub-segments 24. It should be recognized that the illustrated travel path 20 and line segments 22 are only exemplary and such travel path and line segments 20, 22 will vary widely depending upon the type of facility, layout of the facility, type of manufacturing operations, travel paths selected to avoid people and any other desired considerations. It should also be recognized that a particular facility may have multiple travel paths 20 such that a particular group of AGVs may stay on a first travel path while a second group may stay on a second travel path, although the system is so flexible such that AGVs could be easily added or taken away depending upon the need in any one given travel path.

Once the travel path 20 and line portions 22 are determined, they are input into at least one of a central controller 70 or AGV controller 90. The input may be simply a program upload or in some instances may be a learning system wherein the AGV 50 is manually directed along the path 20. While the initial line 30 and end line 40 forming a particular line portion 22 may be completely virtual and programmed into an AGV controller 90, it is expected that in most instances such an initial line 30 and end line 40 will be physically delineated within the facility. More specifically, it is expected that the sensor module 82 and sensors 84 may determine and sense the initial line 30 and end line 40. By providing actual, physical markers within the facility such as optical markers or magnetic tape on the supporting surface, the potential for errors is minimized and it ensures that each AGV 50 is capable of tracking the distance or time since the AGV 50 crossed the initial line 30 within a particular line segment 22 in a consistent and reliable manner. Any number of known techniques may be used to input the guided route for the AGV to follow into one of the controllers 70, 90. It should be recognized in some systems 10 the system 10 will not include a central controller 70 but may be distributed and controlled amongst the individual AGVs 50.

Each AGV 50 will be assigned a unique ID. The unique ID may be hard-built into the AGV 50 by the manufacturer or may be virtually assigned when each AGV 50 is added to a particular travel path 20. The unique ID allows each system 10 to easily determine which AGV 50 is in a particular line segment 22 as well as communicate spacing and distance traveled over an initial line segment 30. In addition, the unique ID may be used in determining the lead AGV 52, subsequent AGVs 54 and last AGV 58 in a particular line segment 22. The unique ID assigned to each AGV 50 may also be used in associating a lead token with the lead AGV 52 as well as a last token with the last AGV 58. These tokens then may be automatically updated as described below as AGVs cross in and out of a particular line segment 22.

During operation, the system 10 may guide the plurality of AGVs along the travel path and in and out of particular line segments 22. The guiding of individual AGVs 50 along the travel path 20 may be done by any known method including methods such as inertial guidance, dead-reckoning, magnetic systems including magnetic tape, markers, paint or guide wires, optical guidance systems, or any other type of guidance system. It is expected that markers or other instructions needed for any particular guidance system will be added by the facility as needed for that particular guidance system. The additional markers added are markers specifically delineating the start and end of line segments particularly the initial line 30 and end line 40 of particular line segments unless the particular guidance system supports virtual markers, however, a virtual initial line 30 and a virtual end line 40 must then be. As such, it is expected that if an AGV uses an inertial guidance which is free from external sensor inputs other than accelerometers and wheel encoders, an optical or magnetic sensor will form one of the sensors 84 and be used to determine the added initial and end lines 30, 40.

When the system 10 is operational, the system 10 automatically determines the lead AGV 52 in a particular line portion 22 as well as the last AGV 58 in a line portion 22. With the lead AGV 52 and last AGV 58 determined, the order of each subsequent AGV 54 following the lead AGV 52 is also known. The unique IDs assigned above allow the system 10, even if it is a distributed control system, to easily and readily determine the order of AGVs along a travel path 20 and in particular the order of the AGVs within a particular line segment 22.

With the system 10 knowing the location of each AGV 50 within a particular line segment 22, as the AGVs 50 progress along the travel path 20 and a lead AGV 52 crosses the end line 40, the system 10 will automatically update the lead AGV 52 to correspond to the immediate subsequent or trailing AGV 54. As such, the immediate subsequent or trailing AGV 54 becomes the lead AGV 52. Similarly, the system 10 automatically updates the last AGV in the line portion 22 each time an AGV 50 from the plurality of AGVs 50 in a particular travel path 20 crosses the initial line 30 of the line portion 22. The system 10 may use a lead token which is transferred from AGV 50 to AGV 50 such as being associated with each unique ID as well as a last token which is also transferred between each AGV 50 as a new AGV 50 becomes the last AGV 58. It is important to note that the system 10 automatically updates the last 58 and lead 52 AGVs which is always changing in a particular line segment 22.

To provide consistent through-put, the system 10 automatically maintains a designated space 60 between each AGV 50 from the plurality of AGVs 50 within the line portion 22. In addition, it is expected that the system 10 will maintain a consistent speed between each of the AGVs 50 in a line portion 22. A central controller 70 may control the AGVs 50 to maintain the designated spacing 60, however, each AGV 50 may individually control the spacing 60 between it and the prior AGV. More specifically, a prior AGV 50 may communicate with a subsequent AGV 54 its distance traveled from the initial line 30, which the subsequent AGV 54 compares at that time to its distance traveled from the initial line 30 to determine the designated space 60 between the AGVs. If the spacing does not match the preset designated spacing, the AGV 50 may adjust its speed and continue the process of cycling communication, determination, and adjusting the speed until the designated spacing 60 is maintained.

It is expected that while inputting the travel path and line segments into the guidance system of an AGV 50, the desired line speed for the AGV to travel along any particular line portion 22 is also input. As such, both the designated spacing and line speed may be predetermined for a particular line portion 22 such that the AGVs 50 act similar to a traditional conveyor system and are capable of replacing a traditional conveyor system. In addition, a variety of travel speeds may exist such as the AGV 50 in one line segment 22 traveling faster than the AGV 50 in a subsequent line segment 22. Furthermore, in areas of the travel path 20 which are not line segments 22, it may be desirable to quickly move the AGV from the end line 40 of one line segment 22 to the start or initial line 30 of another line segment 22. By increasing the speed of the AGVs 50 in areas that do not form part of the line portion 22, the number of AGVs needed are minimized as an AGV may quickly exit a particular line portion 22 and travel with increased speed travel to the start of the next line portion 22. Of course, consistent speed may be kept through the whole travel path.

Even though the speed of a particular AGV in a line segment 22 is typically predetermined, or should match a set speed or speed range, the lead AGV 52 in any particular line segment 22 indirectly sets the actual speed of subsequent AGVs 54. By the lead AGV 52 indirectly setting the actual speed of the subsequent AGVs 54, each AGV following matches the lead AGV's speed. More specifically, the AGVs maintain the desired spacing 60 between each AGV 50 in a line portion 22 and as such, the speed of the individual AGVs is substantially matched. Only the lead AGV 52 attempts to follow the set or predetermined speed while all subsequent AGVs 54 try to indirectly match the speed of the lead AGV 52 by maintaining the designated spacing 60. More specifically, while the lead AGV 52 generally attempts to match its pre-programmed speed for its particular position along a travel path and particularly along a line portion 22, some variations occur and to ensure designated spacing 60 between subsequent AGVs 54, the subsequent AGVs only match the lead AGVs speed by maintaining designated spacing 60. More specifically, the subsequent AGVs 54 do not specifically match the lead AGVs' 52 speed and the lead AGV does not communicate its speed to other AGVs, but by maintaining the designated spacing 60, the speed of the lead AGV 52 is indirectly matched with minor variations. The designated spacing 60 is easier to match than speed as an encoder on a wheel may easily track the distance traveled from the point where the AGV entered the line segment 22 for each AGV. As the initial line 30 is physically delineated, the lead AGV 52 and subsequent AGVs 54 use the distance traveled in calculating the spacing, which is more consistent than speed for any given AGV. Therefore, while the lead AGV 52 generally sets the speed for subsequent AGVs, the system in reality is using the distance traveled as a comparison of spacing 60 and any adjustments of speed in subsequent AGVs 54 are to adjust the spacing 60 not generally to match the speed of the previous AGV. However, to maintain spacing, the subsequent AGVs 54 will need to match the speed of the prior AGV as well as lead AGV 52 and will do so indirectly through calculating the distance between the AGVs. As such, the system 10 uses very little computational power as it only tracks the distance traveled by the AGVs since crossing the initial line 30 to enter the line portion 22. Therefore, after an AGV 50 crosses the end line 40 of a particular line portion 22, the distance traveled is cleared from the memory of the AGV because it is either in a new line segment 22 or it is in a travel path 20 between line segments or portions. Therefore, as each AGV 50 travels along a particular line portion 22, an AGV determines its distance traveled and communicates it to at least the subsequent AGV 54. The subsequent AGV 54 then takes its own distance traveled and compares it to the distance traveled to the prior AGV to determine the current distance between such AGVs and if the determined distance matches the designated spacing 60 desired at that position along the line portion 22. If the designated spacing 60 does not match the actual spacing, the subsequent AGV 54 will adjust its speed slightly to either increase or decrease the speed and as such, decrease or increase the distance between such AGVs. The system 10 continuously cycles by communicating from one AGV 50 to at least the subsequent AGV 54 the distance traveled, receiving a communication of the distance traveled by the prior AGV, determining its own distance traveled, comparing it to the distance traveled of the prior AGV and adjusting speed as necessary. Adjustments in speed may be limited such that an AGV does not go faster or slower than a desired range within a particular line portion 22. In addition, the adjustments in speed may be limited as the designated spacing is approached such that the AGV is not constantly overcorrecting. Therefore, a range of error is allowed on each side of the designated spacing. This range may be determined and vary widely between systems. In each event, the system, in particular each AGV 50, attempts to match the designated spacing 60 by continuously calculating the designated spacing using distance traveled for each adjacent AGV adjusting as needed and then performing the calculations again. The type of operations being performed, type of facility, and spacing 60 designated between each AGV 50 may all affect how often the system 10 needs to cycle its calculations.

It should be noted that as the AGV 50 uses distance traveled in calculating and maintaining the designated spacing 60, wheel slip may occur thereby providing false readings on the distance traveled. In addition, while the present invention refers to the distance traveled with an encoder on the wheels, other systems may be used to calculate the distance traveled, such as optical markers or any other known system. As most AGVs include an obstacle avoidance system such as detecting unexpected objects in the path, which many times are people crossing the path of the AGV, such systems may also be used to ensure that the AGVs do not collide in the event that any particular AGV in the line portion 22 has an incorrect distance traveled, which leads the subsequent AGVs 54 to believe that the prior AGV 50 is located a greater distance away than its current actual distance. Therefore, the obstacle avoidance system may be used to ensure adjacent AGVs do not collide if a mistake occurs in the travel distance, as the travel distance is used to adjust the designated spacing 60 between individual AGVs.

The use of a travel distance is particularly beneficial in maintaining designated spacing in the event of a stopped condition. A stopped condition may occur from a variety of events such as an error on a machine in the facility such that all of the AGVs subsequent to a particular work station must stop, a breakdown of an AGV, or even a person crossing the path of the AGV. As AGVs are already communicating distance traveled, a particular AGV may detect that the AGV ahead of it is stopped by the fact that the distance between it and the AGV ahead is shrinking. The trailing AGV will slow to maintain spacing. A minimum allowed spacing is set for the particular AGV/load/segment combination. When the distance between the AGV and the AGV ahead fall to or below that minimum distance the AGV stops. Each subsequent AGV in the segment similarly slows and stops. In some systems, it is desirable that all AGVs in the segment remain within proper spacing or a very small range in spacing. In some systems, it is desirable to stop the entire line when any AGV stops. As AGVs are already communicating distance traveled, a particular AGV may communicate to all AGVs or all subsequent AGVs in the segment the stop status upon stopping in response to a stopped condition.

All AGVs 54 in the particular segment or all subsequent AGVs, as soon as a stopped status is received from any prior AGV, would stop until it receives a restart signal from the originally stopped AGV. Upon the removal of a stopped condition of the any stopped AGV particularly a first stopped AGV, it would communicate a restart signal to all of the AGVs in the same segment. This restart signal may be communicated down the complete line of AGVs in a particular line segment or communicated from AGV to AGV such that a prior AGV only communicates with the subsequent AGV 54 such that once the subsequent AGV restarts, it then sends a restart signal to the next subsequent AGV. In any stopped condition, it is likely that many of the AGVs need to stop quickly and as such, the designated spacing between particular AGVs may vary in a stopped condition due to timing in receiving the stopped signal or even differences in the braking capabilities of AGVs, loads carried or other conditions. Once each AGV is stopped or in response to a restart signal, the subsequent AGV calculates the designated spacing between adjacent AGVs and determines if any adjustment is needed during the starting or restart procedure to maintain the designated spacing. For example, if a prior AGV entered a stopped condition due to a person stepping the path of the AGV, it would stop quickly and at the same time send a stop signal to the subsequent AGV. Upon receiving the stopped signal, the subsequent AGV would stop, however, minor communication delays may cause the subsequent AGV to reduce the designated spacing to an amount less than desired. Therefore, when a restart signal is sent, the AGV receiving the restart signal would calculate the distance to the prior AGV during the stopped condition and determine if a start delay is needed.

If the determined distance between the adjacent AGVs is greater than or approximately equal to the desired maintained spacing 60, the AGV would start as soon as receiving restart signal as the start delay would be zero. However, if the spacing 60 is less than what is desired, the AGV would calculate a start delay which upon starting would place it in the designated spacing 60 to minimize further adjustments needed. Therefore, upon exiting a stopped condition and receiving a restart signal, the start delay is automatically calculated and adjusts so that upon restart the AGV is immediately within the designated spacing. Therefore, a starting procedure for a plurality of AGVs has little effect on the system and only minor adjustments are needed once each AGV is operational and traveling down the travel path 20. However, it is expected that due to variances in AGVs and loads, some AGVs may accelerate faster than other AGVs, even if the acceleration is limited in a restart condition. Therefore, the AGV, upon restart, would as described above, determine the distance between the two adjacent AGVs and adjusting its speed as necessary to approach the desired spacing 60. It should also be noted that if an AGV 50 in the center of a line portion experiences a stopped condition, the prior AGVs may continue on without stopping and as each AGV exits the line portion, such as passing through the end line 40, the lead token is passed from one AGV to another and as such, the first stopped AGV may receive the lead token as the last AGV exits from the moving group of AGVs. If an AGV experiences a stopped condition, once the designated spacing grows beyond a certain distance with a prior AGV, the stopped AGV, upon restarting may also be assigned a lead token such that two AGVs within the line portion are acting as lead AGVs so that the second lead AGV does not try to catch up to the last AGV in the group with the original lead AGV.

The system may also be configured to automatically receive and adjust spacing depending upon the particular loads carried by an AGV. In some instances, a load carried by an AGV such as a tugger or forklift may vary in length and such length may be provided to the AGV automatically and the AGV may adjust automatically the desired designated spacing 60 such that it accounts for variations in the length of the load and the carrier. Therefore, the AGVs may maintain the designated spacing between adjacent AGVs irrespective of the type of load or length of a particular load or even variations between the AGVs used on a particular line segment.

As the AGVs communicate distance traveled and use such communicated distance to determine and maintain the designated spacing 60 between particular AGVs 50, upon a failure of communication by a particular AGV, a variety of steps may be taken. First, a particular AGV that is subsequent to the AGV with the communication failure may stop. Second, the AGV with the communication failure may stop as it is unable to receive distance traveled from a prior AGV. Third, the AGV may use external markers to update the position. Fourth, the AGV with the communication failure may be configured to automatically leave the line segment and travel path and travel to a repair area. Similarly, the AGV may be manually removed from the segment. For example, the system may automatically determine that the AGV with the communication failure is no longer responsive and the unique ID is removed from the system and as such, system controller, or the distributed controller determines then new order for the AGVs in the segment. With the new order, each AGV performs its function of lead AGV, subsequent AGV, and last AGV to maintain proper spacing. In view of the above, the system 10 may automatically remove an AGV 50 and adjust the spacing 60 as needed between the remaining AGVs such that the operations being performed in any particular line portion 22 do not need to stop due to a simple communication failure. When an AGV breaks down, operators remove the AGV from the path. The system automatically performs the steps above to re-sequence the vehicles to allow a restart.

Therefore, during operation in the present invention, the first AGV 52 which is the lead AGV generally acts as a pace car to the subsequent AGVs. The first AGV 52 travels through the line segment or portion 22 at the desired speed and the second AGV in line or subsequent AGV 54 follows the lead AGV 52 at the desired spacing distance. Therefore, the second or subsequent AGV 54 to the lead AGV 52 and each one thereafter is allowed to travel at the nominal speed but with enough speed modulation and range in the allowed speed to allow it to track and maintain a desired distance 60 behind the lead AGV 52 or any prior AGVs.

Therefore, the system 10 is aware of a particular AGV's 50 position on the line segment 22, which is accomplished as described above using a sensor that detects the initial line 30 and then detects the distance traveled along the line segment 22 since crossing the initial line 30. The sensor 84 used to detect the initial line 30 may be any type sensor, such as proximity switch, limit switch, photo cell, magnetic sensor, bar code reader, RFID sensor, or any other sensor capable of detecting an appropriate target that senses or provides data that the AGV is crossing the initial line 30. The sensors 84 may also be used to update the guidance system to targets along the line segment. However, a simple way to determine distance from the line segment would be a second sensor such as an encoder attached to the wheel of the AGV, preferably a trailing wheel and not a drive wheel, such that the encoder provides the distance traveled as the wheel turns.

As the system 10 needs to communicate distance traveled between each AGV 50, the system generally 10 includes the communication system 72 as described above. The communication may be centrally controlled such that each AGV communicates only with a central controller 70 or may be distributed such that each AGV communicates directly with other AGVs in the system 10. However, the communication works, the AGVs communicate their position on the line segment 22 by communicating the distance traveled from the initial line 30. By communicating the distance traveled and any unique ID of a particular AGV, the relationship of each AGV on a line segment 22 may be determined such that a central controller may determine the order of the AGVs on the line segment and the distance between each AGV or each AGV may determine such information. If the communication is distributed, such as only at each AGV level, each AGV may determine the position of the AGV ahead of it by scanning the distances reported by each of the other AGVs in the segment. As described above, the unique vehicle ID or token may be assigned to each AGV allowing it to communicate its position on the line and in particular, the tokens may be useful in determining the lead and last AGVs 52, 58. Therefore, when a particular AGV enters a line segment 22 by crossing an initial line 30, the communication system may query the ID of the last vehicle to cross and provide it with a last vehicle token while the former last AGV either clears or transfers such token. Similarly, the lead AGV token may be transferred between AGVs.

As each AGV broadcasts its position on the line segment, particularly its distance traveled, each AGV may determine the spacing between it and the prior AGV. The AGV controller 90 may use known control methods such as PID to modulate its speed and maintain a constant distance between itself and the prior AGV. In the event a particular AGV stops due to failure, operator intervention or other stopped conditions, the controller of the stopped AGV may send a signal to the other AGV controllers to stop and every AGV currently on the line segment 22 or just subsequent AGVs may stop. When the AGV restarts, a similar communicated signal from the restarted vehicle to the other AGVs provides a restart.

As described above when AGVs stop, communication delays, equipment failures, or just differences between particular AGVs may cause each AGV to lose its proper designated spacing 60. To control spacing and prevent collision, the system uses the computed and communicated distance above such as by determining the difference in the position of the AGVs as well as the length of any particular carrier and any system specific factors for minimal allowable spacing. Therefore, each AGV may travel up to the designated spacing without interfering with the AGV ahead during a stopped condition as each AGV controller 90 includes the distance to the AGV ahead or prior AGV. In addition, as each AGV is able to detect any errors in spacing such that when the prior AGV restarts from a stopped condition, a start delay may be calculated such that any restart is delayed until proper spacing exists. Similarly, if the spacing is larger than the desired minimal spacing, the subsequent AGVs may increase speed in a limited manner to approach the desired designated spacing. Even in the event of a severe failure such as failure of the communication system or communication between each AGV, based upon the last communicated position of a prior AGV, the subsequent AGV knows the safe distance it may travel before requiring a stop. Therefore, if a failed vehicle is removed from a particular line segment, the data may be immediately sorted such that the distances between the vehicles are reestablished without including the removed AGV and the signals to start may be initiated from one vehicle and sent through other AGVs within the line segment 22.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of operating a conveyor system for material handling in a facility, said conveyor system including a plurality of automatic guided vehicles, each having a controller including a communication system and a guidance system, said method comprising steps of:
    determining a travel path having at least one line portion defined by an initial line and an end line;
    inputting a guided route for the automatic guided vehicle to follow into the guidance system, wherein the guided route includes instructions regarding the plurality of automatic guided vehicles travel along the at least one line portion;
    assigning a unique ID to each automatic guided vehicle;
    guiding the plurality of automatic guided vehicles along the travel path;
    automatically determining a lead automatic guided vehicle in the at least one line portion;
    automatically determining a last automatic guided vehicle in the at least one line portion;
    assigning a token to at least one of the lead automatic guided vehicle and the last automatic guided vehicle;
    automatically updating, using at least one of a central controller and the controller on at least on one of the plurality of automatic guided vehicles, the last automatic guided vehicle in the at least one line portion each time an automatic guided vehicle from the plurality of automatic guided vehicles crosses the initial line of the at least one line portion;
    automatically updating the lead automatic guided vehicle to a subsequent automatic guided vehicle in the at least one line portion each time the lead automatic guided vehicle from the plurality of automatic guided vehicles crosses the end line; and
    maintaining a designated spacing between each automatic guided vehicle from the plurality of automatic guided vehicles within the at least one line portion.

2. The method of claim 1 further including a step of inputting the travel path, including the at least one line portion, into each guidance system of the plurality of automatic guided vehicles.

3. The method of claim 1 wherein said step of inputting a guided route for the automatic guided vehicle to follow also includes a step of inputting a desired line speed for the automatic guided vehicle to travel along the at least one line portion.

4. The method of claim 3 wherein said step of inputting a guided route for the automatic guided vehicle to follow also includes a step of inputting a desired travel speed for the automatic guided vehicle when the automatic guided vehicle is not in the at least one line portion and wherein the desired line speed and the desired travel speed are not identical.

5. The method of claim 1 wherein the lead automatic guided vehicle has a lead automatic guided vehicle speed and wherein each of the plurality of automatic guided vehicles following the lead automatic guided vehicle in the line portion matches the lead automatic guided vehicle speed.

6. The method of claim 1 wherein said step of assigning a token to at least one of the lead automatic guided vehicle and the last automatic guided vehicle includes a step of assigning a lead token to the lead automatic guided vehicle.

7. The method of claim 6 wherein said step of automatically updating the lead automatic guided vehicle further includes a step of passing the lead token from the lead automatic guided vehicle as it crosses the end line to the subsequent automatic guided vehicle.

8. The method of claim 1 wherein said step of assigning a token to at least one of the lead automatic guided vehicle and the last automatic guided vehicle includes a step of assigning an end token to the last automatic guided vehicle.

9. The method of claim 8 wherein said step of automatically updating the last automatic guided vehicle in the at least one line portion each time an automatic guided vehicle from the plurality of automatic guided vehicles crosses the initial line of the line portion further includes a step of passing the end token from a preceding last automatic guided vehicle to an updated last automatic guided vehicle.

10. The method of claim 1 wherein said step of automatically updating the last automatic guided vehicle in the at least one line portion includes a step of providing the unique ID of the automatic guided vehicle updated as the last automatic guided vehicle to at least one of another automatic guided vehicle and the central controller.

11. The method of claim 1 wherein said step of guiding the plurality of automatic guided vehicles along the travel path includes a step of guiding the automatic guided vehicles through the at least one line portion.

12. The method of claim 11 wherein said step of guiding the plurality of automatic guided vehicles through the at least one line portion further includes a step of guiding the plurality of automatic guided vehicles with the designated spacing and speed in the line portion.

13. The method of claim 11 wherein said step of guiding the automatic guided vehicles through the at least one line portion includes a step of tracking a distance traveled by the automatic guided vehicle since crossing the initial line to enter the at least one line portion.

14. The method of claim 13 wherein after the automatic guided vehicle crosses the end line of the at least one line portion the distance traveled is cleared from memory.

15. The method of claim 1 wherein said step of maintaining a designated spacing between each automatic guided vehicle from the plurality of automatic guided vehicles further includes a step of determining a distance traveled from the initial line on the at least one line portion for each automatic guided vehicle.

16. The method of claim 15 wherein said step of maintaining a designated spacing between each automatic guided vehicle further includes the steps of subtracting the distance traveled of the subsequent automatic guided vehicle from the distance traveled of a prior automatic guided vehicle to obtain a determined distance and comparing if the determined distance between the automatic guided vehicles matches the designated spacing.

17. The method of claim 16 wherein said step of maintaining the designated spacing between each automatic guided vehicle further includes a step of adjusting the speed of the subsequent automatic guided vehicle to approach the designated spacing and repeating said steps of subtracting the distance traveled of the subsequent automatic guided vehicle on which speed was adjusted from the distance traveled of a prior automatic guided vehicle to obtain the determined distance and comparing if the determined distance between automatic guided vehicles matches the designated spacing, and repeating the steps of adjusting, subtracting and comparing until the subsequent automatic guided vehicle and prior automatic guided vehicle are spaced apart with the designated spacing.

18. The method of claim 17 wherein said step of adjusting the speed further includes a step of limiting any speed adjustment within a specified range.

19. The method of claim 17 wherein as said step of adjusting the speed for automatic guided vehicle is performed, each subsequent automatic guided vehicle automatically in response to a speed adjustment by a prior automatic guided vehicle performs the steps of subtracting, comparing and adjusting as needed to maintain the designated spacing between the traveling automatic guided vehicle and the prior automatic guided vehicle.

20. The method of claim 1 wherein said step of maintaining the designated spacing further includes a step of continuously calculating the distance traveled by each automatic guided vehicle from the initial line along the at least one line portion and communicating a distance traveled to one of a prior and the subsequent automatic guided vehicle with the communication system.

21. The method of claim 20 wherein said step of maintaining further includes a step of at least one of a prior automatic guided vehicle and a subsequent automatic guided vehicle calculating the spacing between the two automatic guided vehicles and wherein the subsequent automatic guided vehicle uses the calculated spacing to adjust the speed of the subsequent automatic guided vehicle to approach the desired designated spacing.

22. The method of claim 1 further including a step of stopping at least one automatic guided vehicle in the at least one line portion in response to a stop condition and wherein the stopped automatic guided vehicle communicates a stop status to each subsequent automatic guided vehicle within the at least one line portion and wherein each subsequent automatic guided vehicle stops upon receiving the stop status from any automatic guided vehicle.

23. The method of claim 22 wherein each stopped automatic guided vehicle determines a distance to the immediate prior automatic guided vehicle.

24. The method of claim 23 wherein the lead automatic guided vehicle of the stopped automatic guided vehicle automatically restarts upon removal of the stop condition and communicates a restart signal to at least the subsequent automatic guided vehicle upon starting.

25. The method of claim 24 wherein the subsequent automatic guided vehicle determines a start delay.

26. The method of claim 25 wherein said step of determining a start delay includes the step of determining a distance between the prior automatic guided vehicle and the subject automatic guided vehicle and if the distance is greater than the designated spacing a start delay of zero is determined and if the determined distance is less than the designated distance a start delay of sufficient time to ensure at least the designated spacing is maintained to the prior automatic guided vehicle is determined.

27. The method of claim 25 wherein each subsequent automatic guided vehicle performs the steps of determining a start delay upon receiving a restart signal from the prior automatic guided vehicle.

28. The method of claim 1 wherein said step of maintaining a designated distance further includes the step of automatically determining the length of at least one of a carrier and a load on the automatic guided vehicle and adjusting the spacing between the automatic guided vehicle to match the designated distance while accounting for variations in length of the load and carrier.

29. The method of claim 1 further including a step of maintaining a communication link with the communication system on each automatic guided vehicle between each prior and each subsequent automatic guided vehicle and stopping a subsequent automatic guided vehicle upon failure of the communication link.

30. The method of claim 1 wherein the travel path is a continuous loop and further including a step of directing the automatic guided vehicle along the travel path to a next initial line after the automatic guided vehicle crosses the end line of a current line portion.

* * * * *